United States Patent
Miller

(10) Patent No.: US 10,461,622 B2
(45) Date of Patent: Oct. 29, 2019

(54) POWER GENERATOR WITH DC MOTOR AND AC GENERATOR COUPLED WITH SPROCKETS

(71) Applicant: Raymond F. Miller, Hillsboro, OH (US)

(72) Inventor: Raymond F. Miller, Hillsboro, OH (US)

( * ) Notice: Subject to any disclaimer, the term of this patent is extended or adjusted under 35 U.S.C. 154(b) by 271 days.

(21) Appl. No.: 15/075,894

(22) Filed: Mar. 21, 2016

(65) Prior Publication Data

US 2016/0276917 A1 Sep. 22, 2016

Related U.S. Application Data

(60) Provisional application No. 62/136,255, filed on Mar. 20, 2015.

(51) Int. Cl.
*H02K 47/00* (2006.01)
*H02K 47/04* (2006.01)
*H02K 53/00* (2006.01)

(52) U.S. Cl.
CPC .............. *H02K 47/04* (2013.01); *H02K 53/00* (2013.01); *Y10S 74/09* (2013.01)

(58) Field of Classification Search
CPC ........ H02K 47/00; H02K 47/02; H02K 47/04; H02K 53/00; Y10S 74/09
USPC .................................................. 310/111–114
See application file for complete search history.

(56) References Cited

U.S. PATENT DOCUMENTS

| 2,843,446 | A * | 7/1958 | Singer | G05B 19/16 310/236 |
|---|---|---|---|---|
| 4,613,760 | A * | 9/1986 | Law | H02J 3/40 290/1 C |
| 5,823,280 | A * | 10/1998 | Lateur | B60K 1/02 180/165 |
| 9,136,752 | B1 * | 9/2015 | Alkhoori | H02K 47/14 |
| 2003/0030331 | A1 * | 2/2003 | Bailey, Sr. | F03G 7/08 310/40 MM |
| 2010/0171381 | A1 * | 7/2010 | Ling | H02K 53/00 310/113 |
| 2012/0113697 | A1 * | 5/2012 | Park | H02K 53/00 363/105 |
| 2012/0146441 | A1 * | 6/2012 | Galvan | H02K 53/00 310/113 |
| 2012/0153618 | A1 * | 6/2012 | Hamilton | H02J 3/32 290/50 |
| 2012/0262018 | A1 * | 10/2012 | Thiara | H02K 53/00 310/113 |
| 2015/0048703 | A1 * | 2/2015 | Maldonado | G06Q 50/06 310/113 |

(Continued)

*Primary Examiner* — Julio C. Gonzalez
*Assistant Examiner* — Maged M Almawri
(74) *Attorney, Agent, or Firm* — Dunlap Bennett & Ludwig PLLC

(57) ABSTRACT

A power generator is provided. The power generator may include a battery, a motor and an electrical generator. The motor is powered by the battery which rotates a first rotating shaft. The first rotating shaft rotates a second rotating shaft of the electrical generator, which generates electricity. An electrical wiring may run from the electrical generator to a voltage regulator. An electrical wiring may run from the voltage regulator to the battery, thereby keeping the battery charged. A power inverter may be electrically connected to the battery.

8 Claims, 5 Drawing Sheets

(56) References Cited

U.S. PATENT DOCUMENTS

| | | | |
|---|---|---|---|
| 2015/0188400 A1* | 7/2015 | Kemp | H02K 53/00 310/74 |
| 2015/0200546 A1* | 7/2015 | Demar | H02K 53/00 307/22 |
| 2015/0381080 A1* | 12/2015 | Virella | H02K 53/00 310/52 |
| 2016/0072373 A1* | 3/2016 | Farquharson | H02K 7/116 310/83 |
| 2016/0087487 A1* | 3/2016 | Baek | H02K 47/04 320/107 |
| 2016/0176303 A1* | 6/2016 | Nelson | B60L 11/1805 307/10.1 |
| 2016/0285329 A1* | 9/2016 | Knapp | H02K 53/00 |

\* cited by examiner

POWER GENERATOR WITH DC MOTOR AND AC GENERATOR COUPLED WITH SPROCKETS

CROSS-REFERENCE TO RELATED APPLICATION

This application claims the benefit of priority of U.S. provisional application No. 62/136,255, filed Mar. 20, 2015, the contents of which are herein incorporated by reference.

BACKGROUND OF THE INVENTION

The present invention relates to power generator and, more particularly, to a electrically charged motor generating power to an electrical generator.

Fossil fuel is a general term for buried combustible geologic deposits of organic materials, formed from decayed plants and animals that have been converted to crude oil, coal, natural gas, or heavy oils by exposure to heat and pressure in the earth's crust over hundreds of millions of years.

The use of fossil fuels raises serious environmental concerns. The burning of fossil fuels produces around 21.3 billion tonnes of carbon dioxide ($CO_2$) per year, but it is estimated that natural processes can only absorb about half of that amount, so there is a net increase of 10.65 billion tonnes of atmospheric carbon dioxide per year (one tonne of atmospheric carbon is equivalent to 44/12 or 3.7 tonnes of carbon dioxide.) Carbon dioxide is one of the greenhouse gases that enhances radiative forcing and contributes to global wargmin, causing the average surface temperature of the Earth to rise in response, which the vast majority of climate scientists agree will cause major adverse effects.

As can be seen, there is a need for cleaner energy sources that do not produce greenhouse gases.

SUMMARY OF THE INVENTION

In one aspect of the present invention, a power generator comprising: a battery; a motor powered by the battery and comprising a first rotating shaft; an electrical generator comprising a second rotating shaft rotated by the first rotating shaft; a voltage connector electrically connected in between the electrical generator and the battery; and a power inverter electrically connected to the battery.

These and other features, aspects and advantages of the present invention will become better understood with reference to the following drawings, description and claims.

DETAILED DESCRIPTION OF THE INVENTION

Figure 1:
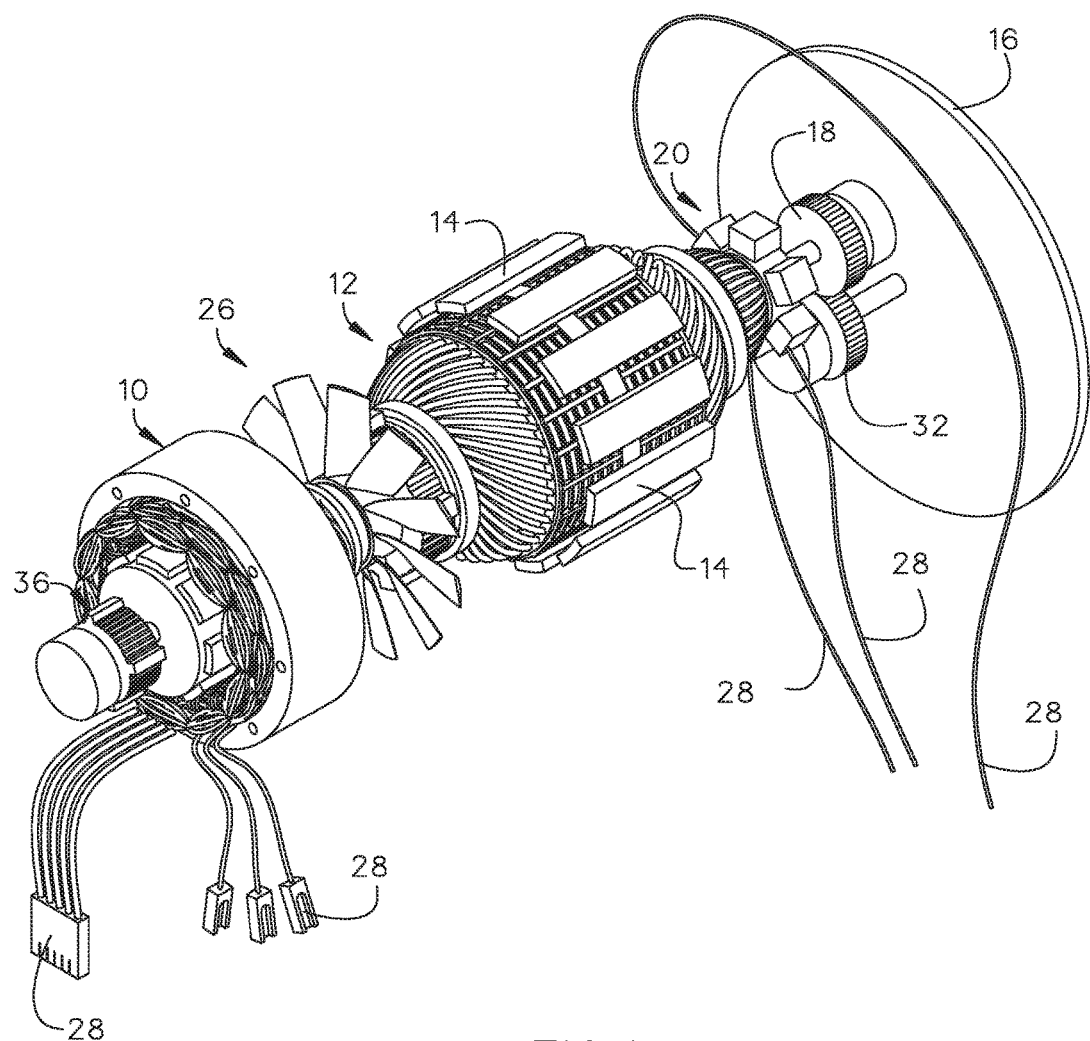
FIG. 1 is a front perspective view of the present invention.
Figure 2A:
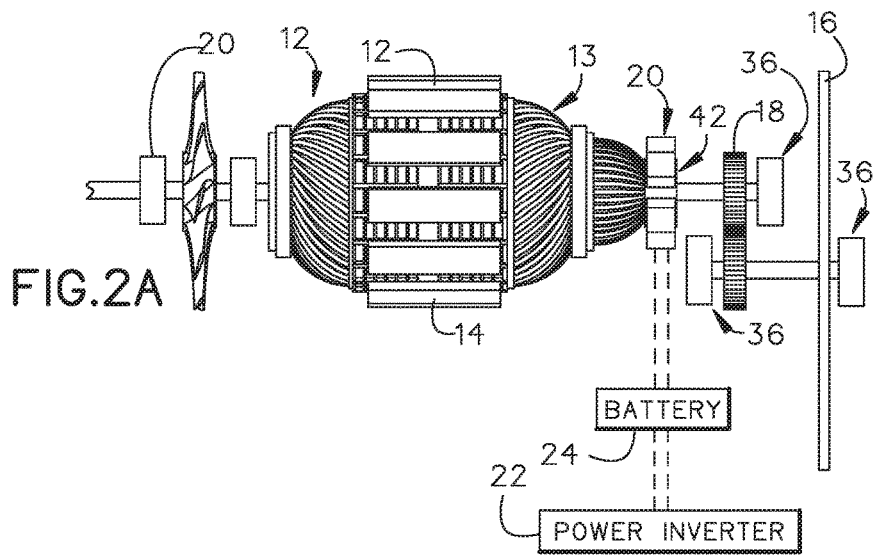
FIG. 2A is a schematic view of the motor of the present invention.
Figure 2B:
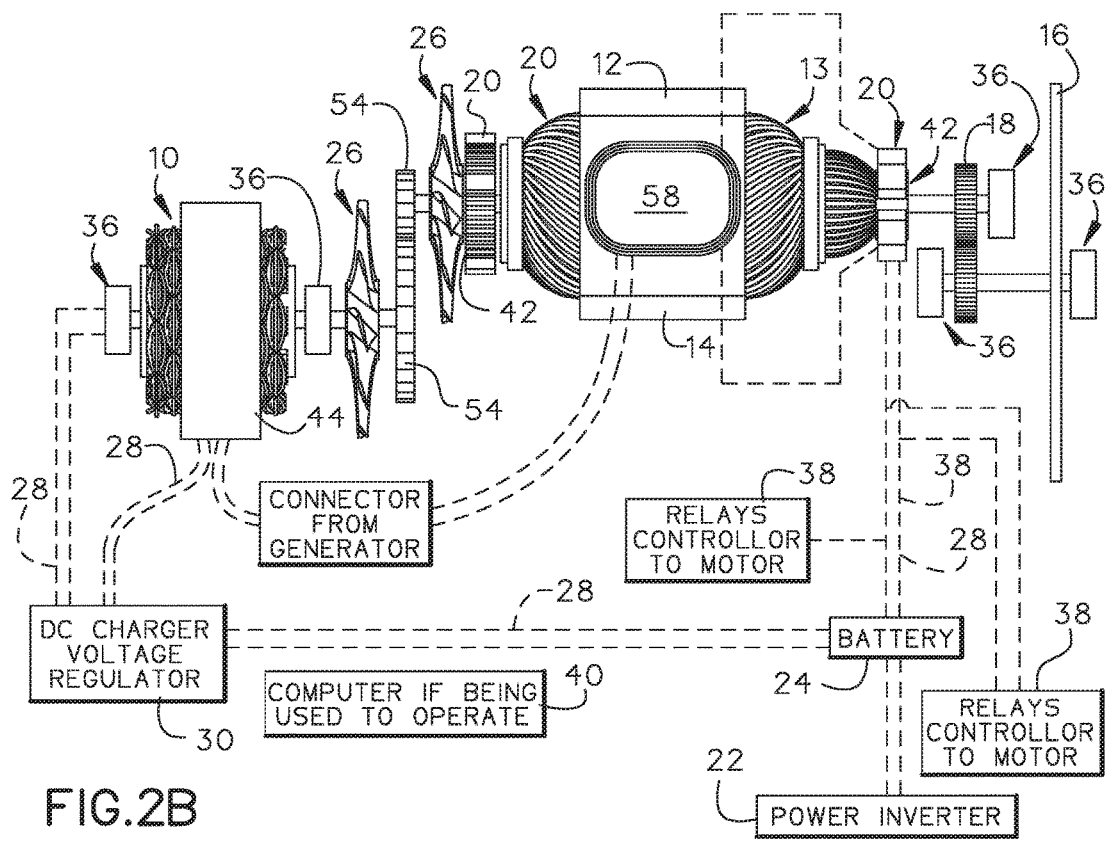
FIG. 2B is a schematic view of an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an AC or DC recharging electric generator for producing AC and DC electricity through kinetic energy. The present invention utilizes of a battery powered motor to recharge itself and produce electricity in the same process and function. The present invention is a self energizing motor. Gasoline generators run out of gas. The present invention regenerates, self energizes and recharges its batteries which are a renewable green energy and non-polluting. The present invention does not use gasoline or other harmful fumes which mean each appliance can have its own motor to operate it independently. The present invention may operate in different modes for different appliances recharging its battery as it is producing electricity.

The present invention includes AC and or DC generator and alternator magneto style with brushes that helps energize the charging electric motor power supply. The gear or chain is driven or directly connected to the motor if desired. The cooling fan and permanent magnets are used. An electro magnet can be used in conjunction if or when needed. A shunt or compound or series multi voltage DC or AC motor and the DC power inlet commentator armature for power inlet are used. A 110 and 240 volts alternating current outlet is used. A roller bearing for the motor and generator is used.

The AC or DC generator can be separate from the motor. Alternatively, the generator may join together or include the same shaft as the motor. In certain embodiments, the shafts may be connected by sprockets and a chain driven by the motor. The generator spins while the charging electric motor is spinning as it is reaching no load capacity which means its spinning as fast as it could go or desired speed to overcome the forces. The present invention adds power to the armature commentator, electro magnets or the charging electric motor main motor which may include permanent magnets. If the present invention is being used with brushless generator, the rotor armature would have magnets around its circumferences they would be running horizontal, it will do the same thing as a brush style generator would be doing.

By using permanent or electric magnets, the AC motor may be able to run its shunt wound variable voltage DC motor using one or more batteries depending on the device that you are trying to utilize. The present invention is made with a flywheel harmonic balancer which uses the laws of motion to help give the motor its kinetic energy.

There are alternate ways in which this motor can be set up from the cluster motor to the dual alternating motor to handle the appliance in which it is designed for. This motor can be used in all fields of technology using any kind of motor. The present invention may run with a device or apparatus that may use or depend on the use of a motor and the present invention may be used with any voltage.

Referring to FIGS. 1 through 16, the present invention includes a power generator. The power generator may include a battery 24, a motor 12 and an electrical generator 10. The motor 12 is powered by the battery 24 which rotates a first rotating shaft. The first rotating shaft rotates a second rotating shaft of the electrical generator 10, which generates electricity. An electrical wiring 28 may run from the electrical generator 10 to a voltage regulator 30. An electrical wiring 28 may run from the voltage regulator 30 to the battery 24, thereby keeping the battery charged 24. A power inverter 22 may be electrically connected to the battery 24.

Figure 10:
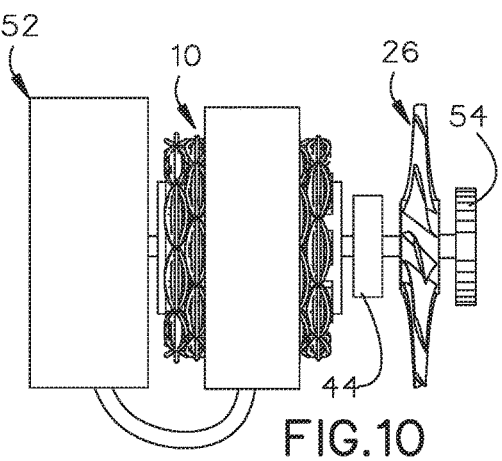
FIG. 10 is schematic view of an alternate embodiment of the invention that shows an advanced engaging and disengaging of the AC motor and generator.
Figure 12:
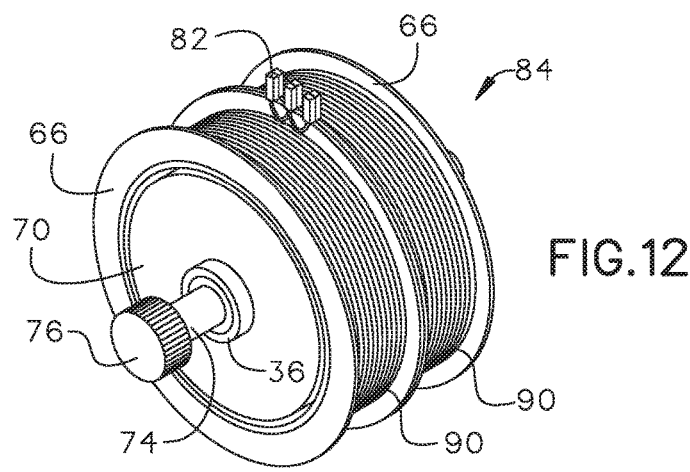
FIG. 12 is a perspective view of an embodiment of the present invention.
Figure 13:
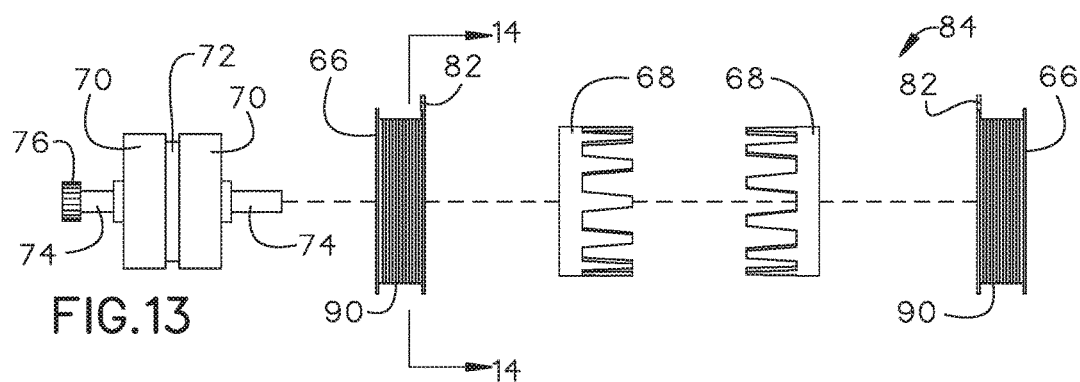
FIG. 13 is a schematic exploded view of an embodiment of the present invention.
Figure 14:
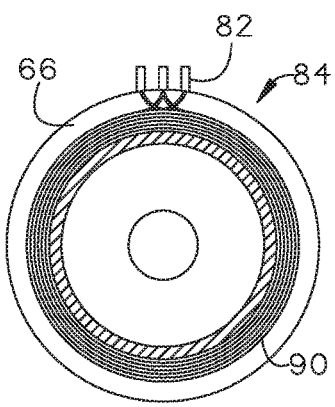
FIG. 14 is a section view of an embodiment of the present invention along line 14-14 in FIG. 13.
Figure 15:
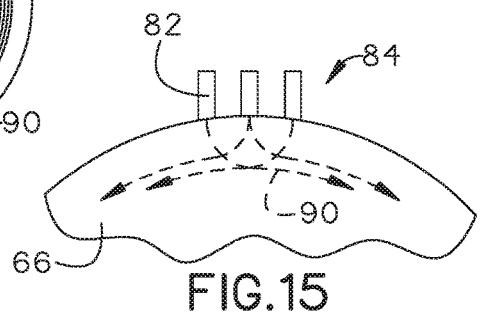
FIG. 15 is a detail schematic view of an embodiment of the present invention demonstrating wire pathway.
Figure 16:
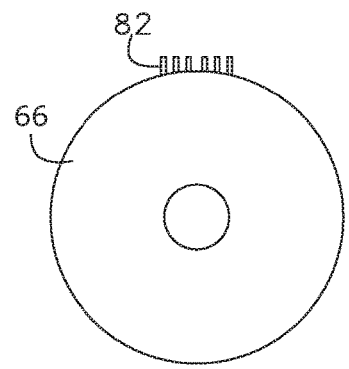
FIG. 16 is a front view of an embodiment of the present invention.

In certain embodiments, the motor 12 may be a direct current motor 13, which includes plurality of stator permanent magnets 14 or alternatively electromagnets 58. In certain embodiments, the motor 12 may include brushes 20 surrounding an armature combiner 42. The first rotating shaft may rotate within bearings 36. The battery 24 may electrically connect with the brushes 20, which may rotate the rotating shaft within the bearings 36. Alternatively, the present invention may utilize an alternative current motor 52 as illustrated in FIG. 10. In certain embodiments, a fan 26 may be secured to the first rotating shaft, which cools the motor 12. A relay controller 38 or a computer 40 may be operatively connected to the motor 12.

A gear 18 may be secured to the first rotating shaft. A kinetic mass 16 may be secured to a third rotating shaft. The third rotating shaft may rotate within bearings 36. The third rotating shaft may include a gear 18 that interlocks with the gear 18 of the first rotating shaft. The kinetic mass 16 may rotate the third rotating shaft, which in turn aids with the rotation of the first rotating shaft.

The electrical generator 10 may include an alternating current generator or a direct current generator. The electrical generator 10 may include slip rings 44 disposed about a coil. The second rotating shaft may rotate within bearings 36. In certain embodiments, a fan 26 may be secured to the second rotating shaft, which cools the electrical generator 10.

Figures 3, 4, 5:
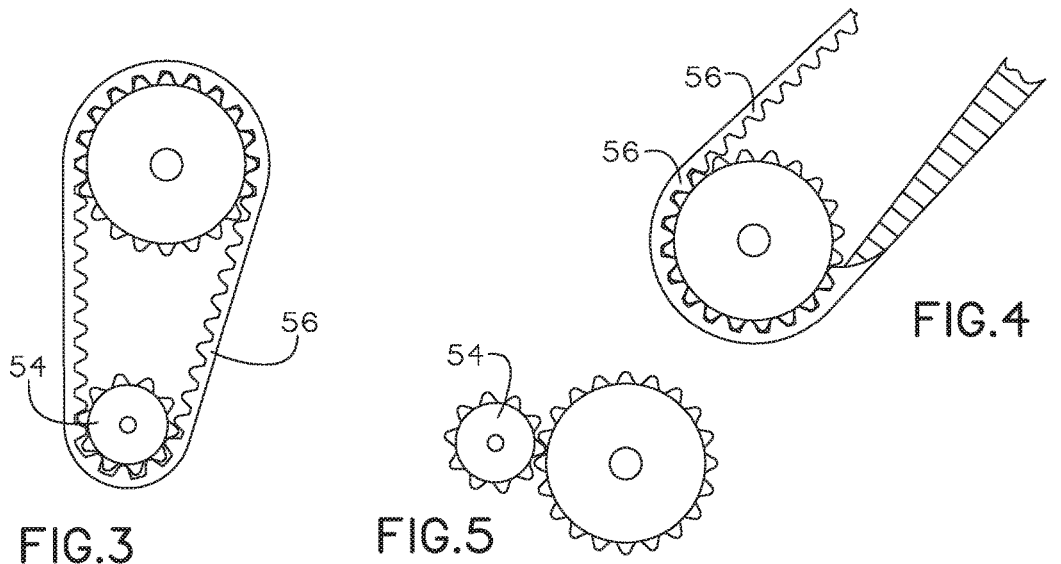
FIG. 3 is a schematic view of the present invention.
FIG. 4 is a schematic view of the present invention.
FIG. 5 is a schematic view of the present invention.
Figure 6:
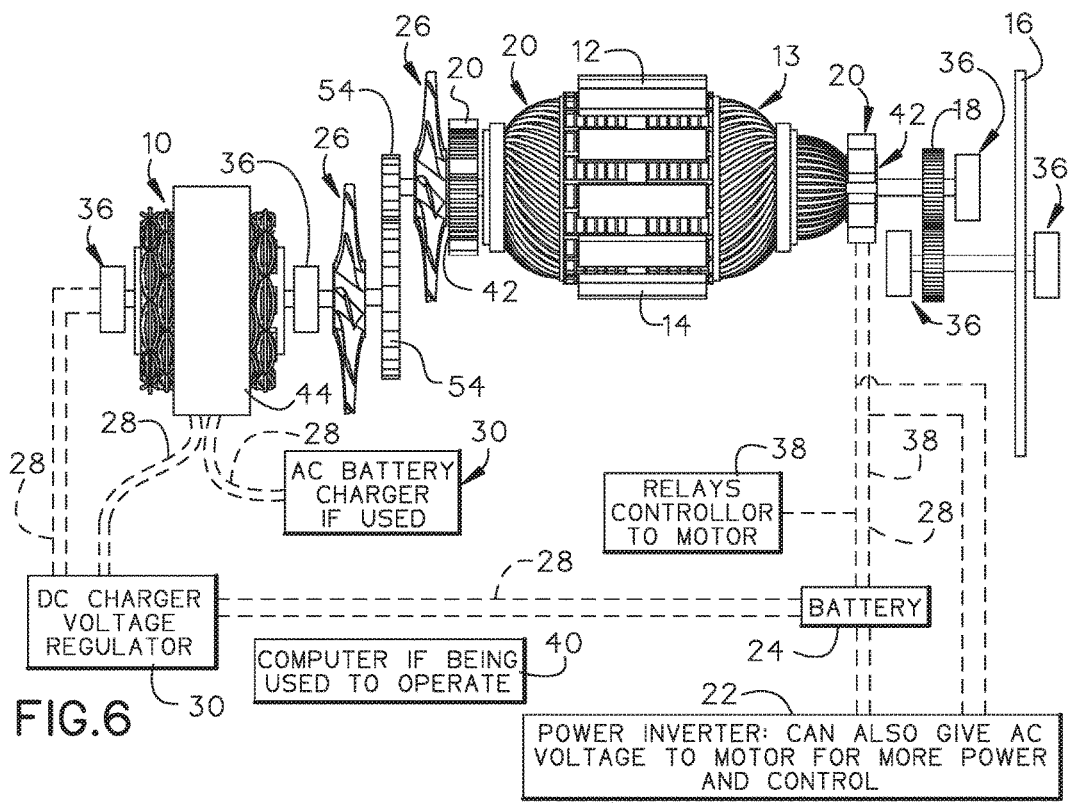
FIG. 6 is schematic view of an embodiment of the present invention.
Figure 7:
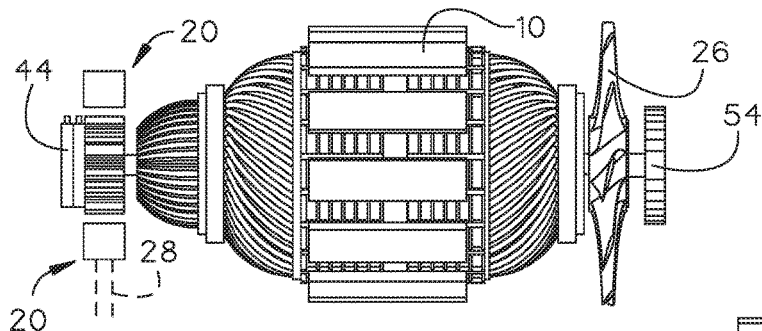
FIG. 7 is schematic view of an alternate embodiment of the present invention.
Figure 8:
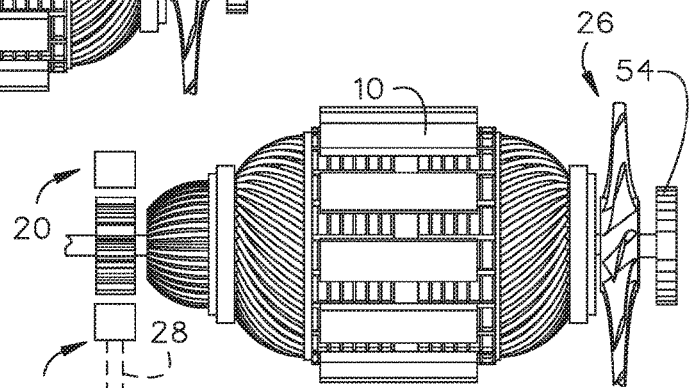
FIG. 8 is schematic view of an alternate embodiment of the present invention.
Figure 9:
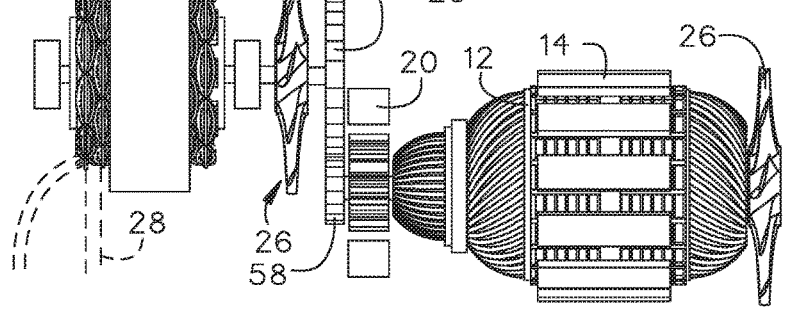
FIG. 9 is schematic view of an alternate embodiment of the present invention.
Figure 11:
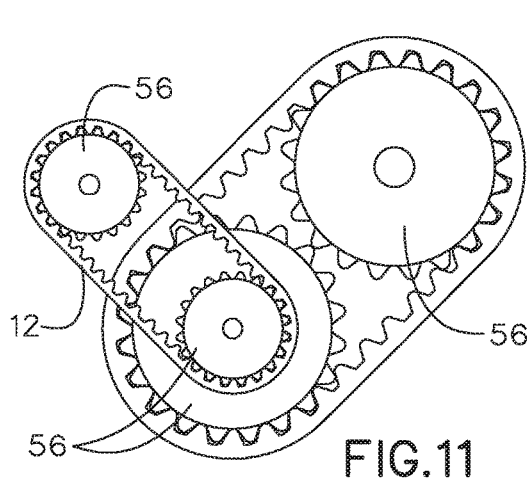
FIG. 11 is a schematic view of and alternate embodiment of the present invention.

In certain embodiments, the second rotating shaft may be directly secured to the first rotating shaft. In alternate embodiments, the first rotating shaft may include a sprocket 54 that interlocks with a sprocket 54 secured to the second rotating shaft. As illustrated in FIGS. 3 and 4, the sprockets 54 may be connected via a chain 56 or belt. As illustrated in FIG. 11, multiple sprockets 54 may be used and joined by multiple chains 56 or belts.

As illustrated in FIGS. 12 through 16, the generator 12 may include a spool version 84. In such embodiments, the present invention includes metal pronged brackets 68, a spool 66 disposed about the metal pronged brackets 68, copper winding 90 disposed about the spool 66, and a spool prong 82. Magnets 70, a magnetic gap 72 and a shaft 74 may be disposed within the metal pronged brackets 68. A sprocket 76 may interlock with the sprocket 54 of the motor 10, which runs the generator 12.

It should be understood, of course, that the foregoing relates to exemplary embodiments of the invention and that modifications may be made without departing from the spirit and scope of the invention as set forth in the following claims.

What is claimed is:

1. A power generator comprising:
    a battery;
    a motor powered by the battery and comprising a first rotating shaft, a first sprocket coupled to a first end of the first rotating shaft, a first gear coupled to a second end of the first rotating shaft, and a first bearing, wherein the second end of the first rotating shaft is rotatably disposed within the first bearing;
    a first fan coupled to the first rotating shaft in between the motor and the first sprocket and configured to cool the motor;
    an electrical generator comprising a second rotating shaft rotatably disposed within a second bearing and a third bearing, and a second sprocket coupled to the second rotating shaft, wherein the first sprocket and the second sprocket interlock such that the first rotating shaft rotates the second rotating shaft;
    a second fan coupled to the second rotating shaft in between the second sprocket and the third bearing and configured to cool the electrical generator;
    a kinetic mass secured to a third rotating shaft, wherein the third rotating shaft is rotatably disposed within a fourth bearing and a fifth bearing, the third rotating shaft comprising a second gear interlocked with the first gear such that a rotation of the kinetic mass rotates the third rotating shaft, which in turn aids with the rotation of the first rotating shaft;
    a voltage regulator electrically connected in between the electrical generator and the battery; and
    a power inverter electrically connected to the battery.

2. The power generator of claim 1, wherein the motor is a direct current motor.

3. The power generator of claim 1, wherein the motor utilizes permanent magnets.

4. The power generator of claim 1, wherein the motor utilizes electro magnets.

5. The power generator of claim 1, wherein the motor comprises a plurality of brushes, wherein the battery is electrically connected to the plurality of brushes.

6. The power generator of claim 1, wherein the electrical generator is an alternating current electrical generator.

7. The power generator of claim 1, further comprising an electrical current battery charger electrically connected to the electrical generator.

8. The power generator of claim 1, further comprising a belt coupling the first sprocket to the second sprocket.

\* \* \* \* \*